United States Patent [19]

Verseef et al.

[11] Patent Number: 4,568,028

[45] Date of Patent: Feb. 4, 1986

[54] DUAL PURPOSE VEHICLE

[75] Inventors: Jan Verseef, Maryhill; Amiya K. Mishra, Cambridge, both of Canada

[73] Assignee: Compro Limited, Toronto, Canada

[21] Appl. No.: 532,613

[22] Filed: Sep. 15, 1983

[51] Int. Cl.⁴ .................. E01C 19/20; B60P 1/16; B60P 1/28

[52] U.S. Cl. .................. 239/657; 239/663; 296/39 R; 298/17.6; 298/22 P

[58] Field of Search .............. 239/650, 657, 663; 298/1 B, 22 P, 17.5, 17.6; 296/39 R

[56] References Cited

U.S. PATENT DOCUMENTS

| | | | |
|---|---|---|---|
| 2,889,172 | 6/1959 | Hoff | 298/22 P |
| 3,036,865 | 5/1962 | Stone | 298/22 P |
| 4,148,528 | 4/1979 | Channell | 298/22 P |
| 4,382,632 | 5/1983 | Pitts | 298/22 P X |

FOREIGN PATENT DOCUMENTS

| | | | |
|---|---|---|---|
| 935206 | 10/1973 | Canada | 239/657 |
| 930728 | 7/1955 | Fed. Rep. of Germany | 298/17.6 |
| 1246867 | 10/1960 | France | 296/39 R |
| 1257456 | 12/1971 | United Kingdom | 296/39 R |

*Primary Examiner*—Andres Kashnikow
*Assistant Examiner*—Mary Beth O. Jones
*Attorney, Agent, or Firm*—Ridout & Maybee

[57] ABSTRACT

The invention relates to improvements in a dual purpose vehicle having a dump body which can be hinged at either the front or rear end thereof so that it may be tipped rearwardly for use as a dump truck or tipped forwardly for use as a spreader. The hinge means have been improved to provide a bearing for receiving the weight of the dump body and the floor of the body is provided with an inlay to allow salt/sand mixtures to flow at a 26° angle of forward tilt.

7 Claims, 10 Drawing Figures

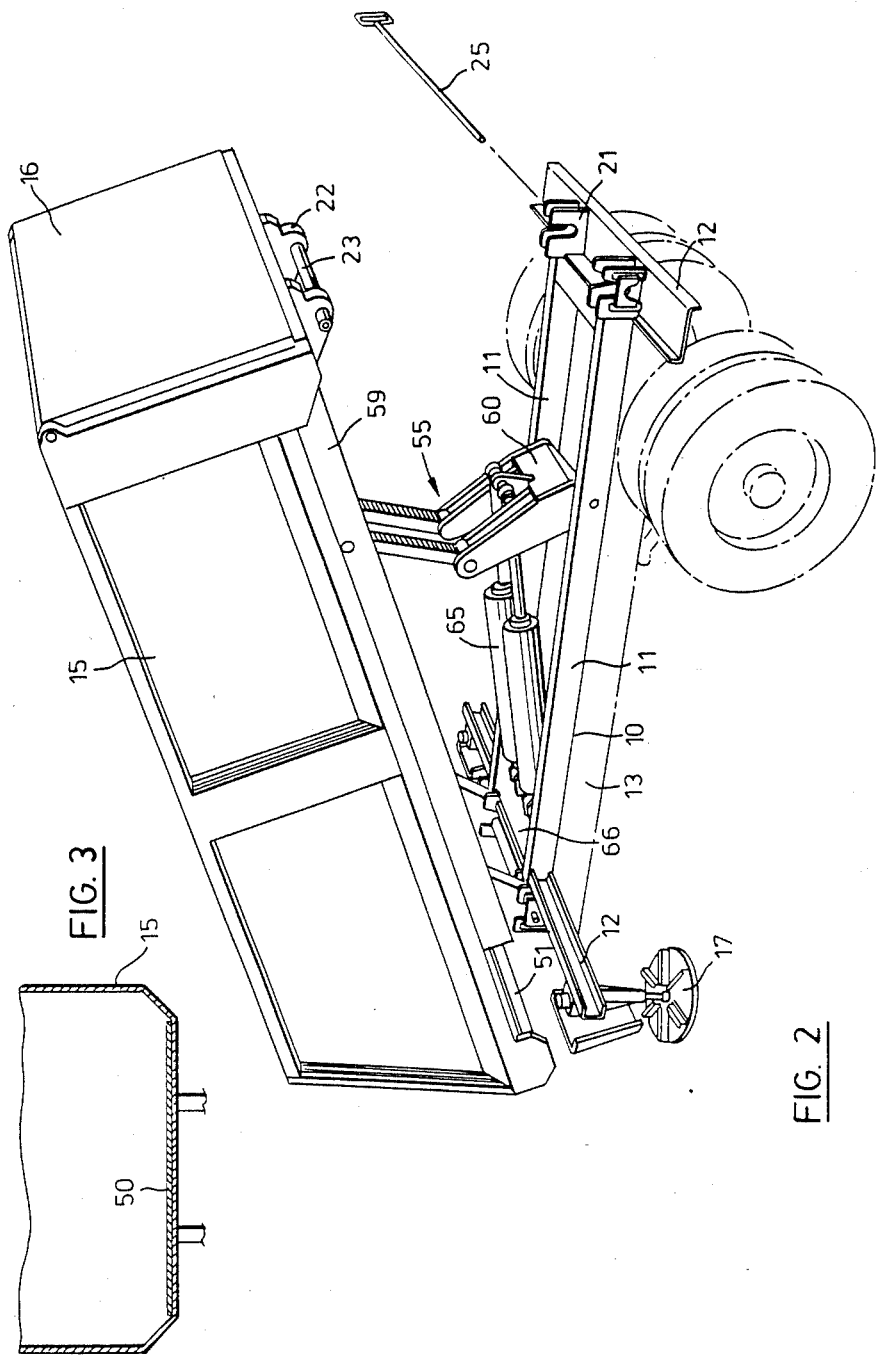

DUAL PURPOSE VEHICLE

The invention relates to improvements in a vehicle adapted for use as a dump truck as well as a spreader or sander such as is used for spreading a salt and sand mixture on roads during icy or snowy conditions. The dual purpose vehicle of the invention is similar to prior vehicles of the same type in that it comprises a dump body which can be hinged at either the front or rear end thereof so that it may be tipped rearwardly for use as a dump truck or tipped forwardly for use as a spreader.

While dual purpose vehicles of this type have enjoyed good commercial success over the past 10 to 15 years, it has been found that the limited capacity of the dump body and the wear on the hinge sockets and hinge pin have posed problems to the user. The size of the dump body is limited in conventional vehicles by the angle to which the body may be tilted when used as a spreader. As the angle required is increased, the length of the body must be decreased in order to provide clearance under normally encountered road overpasses. Also, it has been found that after prolonged use, the hinge means of conventional dual purpose vehicles suffers excessive wear to the extent that it often becomes difficult to align the socket holes so that the hinge pin may be readily inserted.

The present invention overcomes these disadvantages of the prior dual purpose vehicles by providing improved hinge means comprising a bearing for receiving the weight of the dump body thereby alleviating the problem of excessive wear on the hinge sockets and pin. The present invention also employs a dump body having a sufficiently slippery floor so that a shallow angle of forward tilt can be used to effect good flow of conventional salt/sand mixtures, thus allowing the body to be longer and still provide clearance under the normal highway overhead obstructions.

Accordingly, the present invention provides a dual purpose vehicle having a dump body being pivotable in either a forward or rearward direction which comprises a base frame secured to the vehicle chassis with a dump body mounted thereon. The dump body has a removable high density plastic inlay for the floor thereof with a static friction coefficient for a dry sand/salt mixture of less than 0.55. Delivery means are provided within the dump body for delivering sand or other such granular material therein to an outlet near the front end of the body. A spinner or other spreader means is mounted below the outlet in the body for receiving and spreading the granular material. A first and second hinge means are provided at either end of the body and frame each of which comprises interengageable hinge sockets, bearing means for receiving the weight of the body and a hinge pin for maintaining the alignment of the hinge sockets when engaged. Hydraulic means are provided for raising and lowering the dump body pivotally about one of the hinges. Preferably, a toggle linkage is connected between the base frame and dump body at a position intermediate thereof and an hydraulic ram is pivotally connected at one end to the base frame and at the other end to the toggle linkage for actuating the linkage so as to permit pivotal movement of the body about one of the hinges.

A preferred embodiment of the invention is hereinafter described with reference being made to the drawings in which:

FIG. 2 is a perspective view of the dump body and frame with the body in a forward tilted position;

FIG. 3 is a cross-sectional view of the dump body showing the plastic floor inlay;

Figure 1:
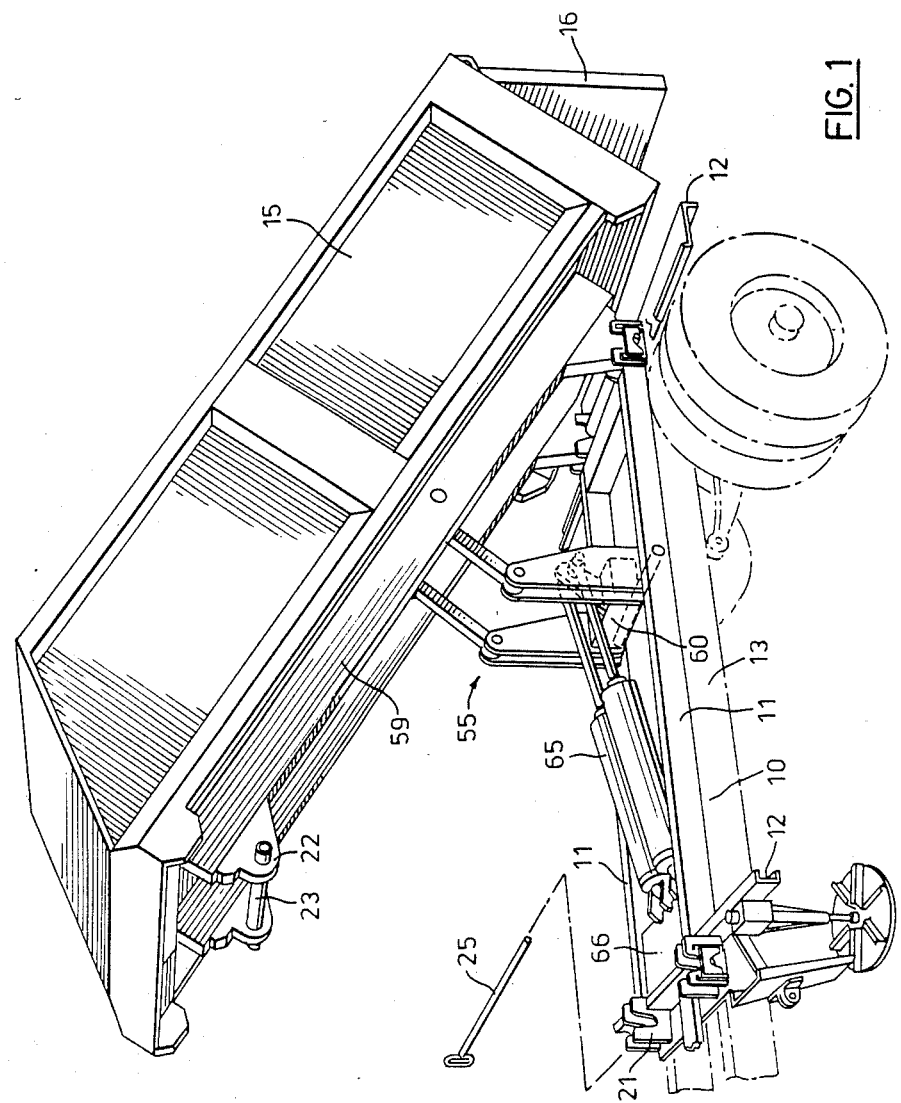
FIG. 1 is a perspective view of the dump body and frame with the body in a rearward tilted position.

Referring to FIGS. 1 and 2, a base frame 10, having longitudinal members 11 and transverse members 12, is secured to a chassis 13 of a suitable vehicle. A dump body 15 is mounted on the base frame 10. The dump body 15 is provided with a tailgate 16 and a delivery means (not shown) near the front end thereof for delivering granular material to a spinner 17 releasably attached to the forward transverse member 12 of the frame 10. When the vehicle is to be used as a dump truck, the dump body 15 is pivotally attached to the base frame 10 at a rear hinge which comprises a pair of hinge sockets 21 affixed to the rear transverse member 12 of the frame 10 and a pair of hinge sockets 22 which are equipped with a tubular bearing 23 affixed to the dump body 15 at the rear of the underside of the floor thereof. The hinge sockets 21 and 22 are positioned to allow for their interengagement and are maintained in position by a hinge pin 25 which may be inserted through the tubular bearing 23.

Figure 4:
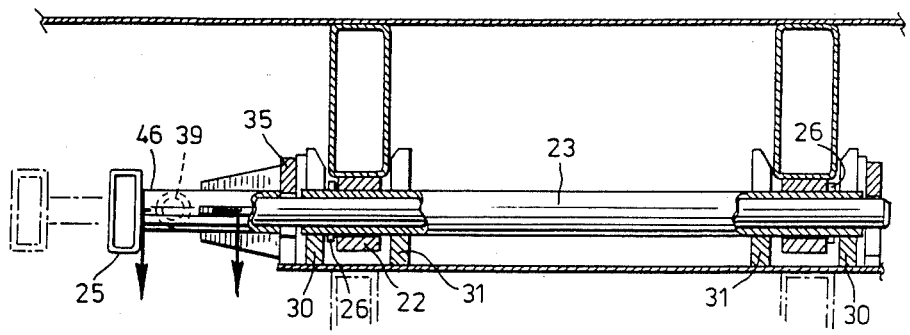
FIG. 4 is a sectional view taken through one of the hinge means.
Figure 6:
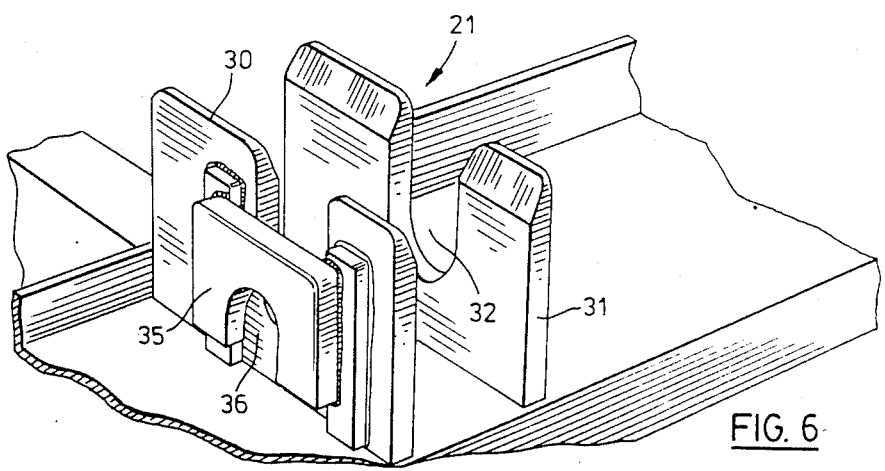
FIG. 6 is a perspective view of a hinge socket located on the frame having retaining means affixed thereto.

The construction and operation of the hinges of the preferred embodiment may be more fully appreciated by reference to FIG. 4. The tubular bearing 23 is freely rotatable about its longitudinal axis and is maintained in position in the hinge sockets 22 by collars 26 which may be conveniently welded to the bearing 23 near the outer faces of the sockets 22 as shown in FIG. 4. The sockets 21 on the frame 10 each comprise a pair of spaced upstanding lugs 30 and 31 each having a slot 32 which align with one another for receiving the bearing 23 (see FIG. 6). With the sockets 21 and 22 engaging one another, the hinge is secured by insertion of the hinge pin 25 through the bearing 23. The pin 25 fits loosely within the bearing 23 for easy insertion and withdrawal. The outer hinge socket lug 30 on the frame 10 is provided with a plate 35 having a hole or slot 36 therein to allow for the insertion and withdrawal of the pin 25 and to prevent upward disengagement of the hinge sockets 21 and 22 when the pin 25 is in place.

Figure 5:
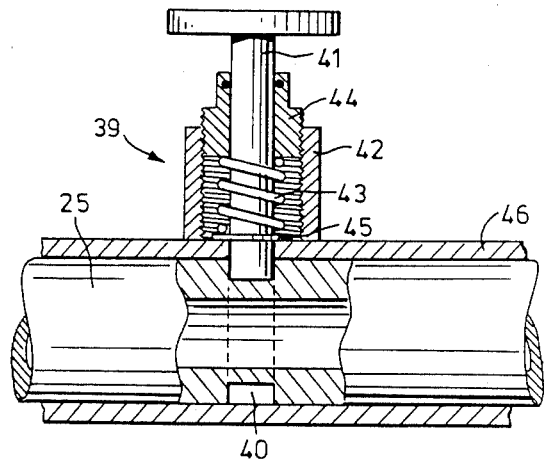
FIG. 5 is a sectional view taken through line 5—5 in FIG. 4 showing details of the hinge pin release means.

Because the hinge pin 25 is loosely contained within the tubular bearing 23, means 39 are provided for retaining the pin in place. While such retaining means 39 may comprise any of several possible devices, FIG. 5 illustrates one way in which the retention of the pin 25 may be accomplished. As shown in FIG. 5, the pin 25 is provided with a groove 40 into which the end of a rod 41 is insertable to prevent longitudinal movement of the pin 25. The rod 41 is positioned on a tubular extension 46 affixed to the plate 35 in a housing 42 and is biased downwardly by a spring 43 acting against a housing member 44 and a collar 45 affixed to the rod 41.

Heretofore, a typical dump body 15 was equipped with a steel floor, and the coefficient of static friction of a dry salt/sand mixture on a steel floor is 0.67. This coefficient of friction requires that the body 15 be tilted forward at an angle of about 34° to effect a satisfactory flow of a salt/sand mixture toward the front thereof for delivery onto a spreading device. At a forward tilt of 34°, the length of the body 15 is restricted to about 11 feet in order that the body 15 might clear under normally encountered highway overhead obstructions.

The present dump body 15 is provided with a removable floor inlay 50 comprising a high density plastic having a coefficient of static friction for a dry sand/salt mixture of less than 0.55. A preferred material for the inlay 50 is a ⅜ inch thick sheet of ultra-high density polyethylene having a coefficient of static friction of 0.53. A suitable material is sold by Hercules Inc. under the trade mark 1900 UHMW polymer.

By using an inlay 50 of this material, the angle of forward tilt can be reduced to 26° while still retaining satisfactory flow of salt sand mixtures. While it is calculated that an angle of 28° is needed to give a satisfactory flow of the sand/salt mixture when the coefficient of static friction is 0.53, the angle can safely be reduced to 26° and still give a completely satisfactory flow of material because such flow will only be required while the vehicle is moving. The vibration transmitted to the dump body 15 while the vehicle is moving serves to assist the material flow (i.e. the coefficient of kinetic friction is less than that for static friction). This shallower angle of tilt allows the length of the dump body 15 to be increased to about 14 feet without giving an increase in the overall height of the vehicle when in the forward tilt position.

When the vehicle is used as a spreader, the granular salt/sand mixture is delivered to a spinner 17, or other suitable spreading device, through an opening 51 in the floor of the dump body 15 by suitable delivery means (not shown). While the delivery means may be an auger, a chain conveyor recessed into the floor is preferred. The recessed conveyor may be covered to give a flat floor for the body 15 when the vehicle is used as a dump truck.

Figure 7:
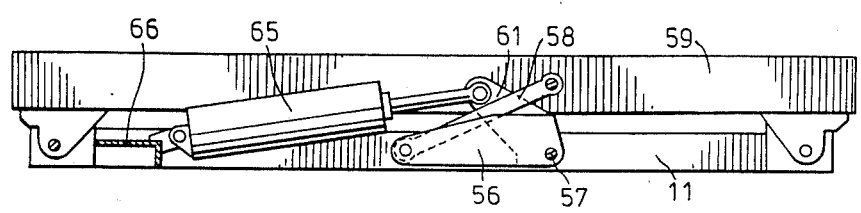
FIGS. 7 through 9 are schematic diagrams of the dump body tilting mechanism wherein the body is in the down, rearward tilt and forward tilt positions respectively.
Figure 8:
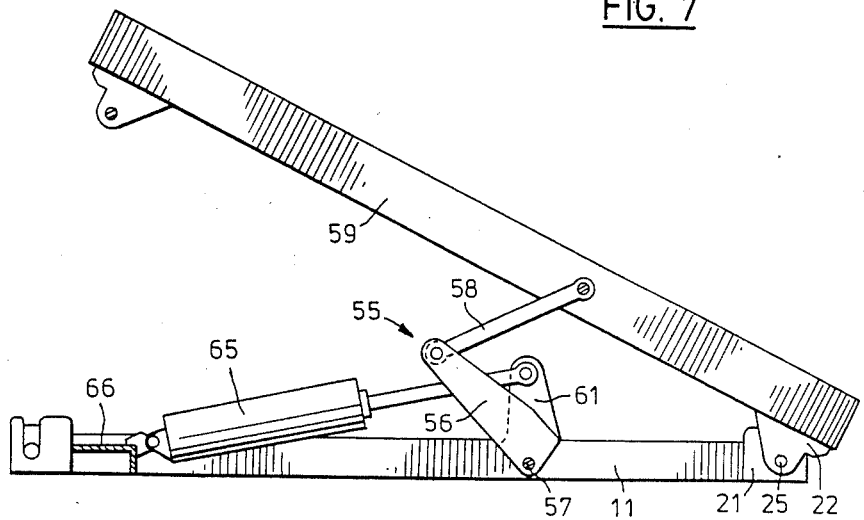
Figure 9:
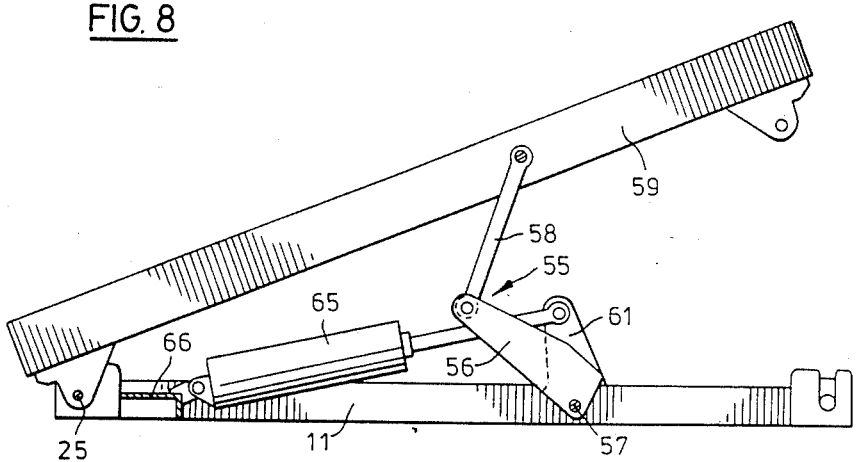

The preferred mechanism for raising and lowering the body 15 is particularly shown in FIGS. 7 through 9. A toggle linkage 55 is attached between the dump body 15 and the frame 10. The toggle linkage 55 comprises side members 56 mounted on a shaft 57 extending between frame members 11, links 58 pivotally connected at their ends to side members 56 and beams 59 on the underside of the body 15, and a cross member 60 connecting the side members 56 and having an upstanding lug 61 affixed thereto. Preferably, twin hydraulic cylinders 65 are used to operate the toggle linkage 55, each cylinder 65 being pivotally connected from a transverse frame member 66 to the lug 61. As shown in FIG. 8, insertion of the hinge pin 25 in the aligned sockets 21 and 22 at the rear of the vehicle allows the toggle linkage 55 to tilt the body 15 rearwardly allowing the vehicle to be used as a dump truck. Alternatively, FIG. 9 shows the operation of the toggle linkage 55 about the forward hinge when the vehicle is used as a spreader.

Figure 10:
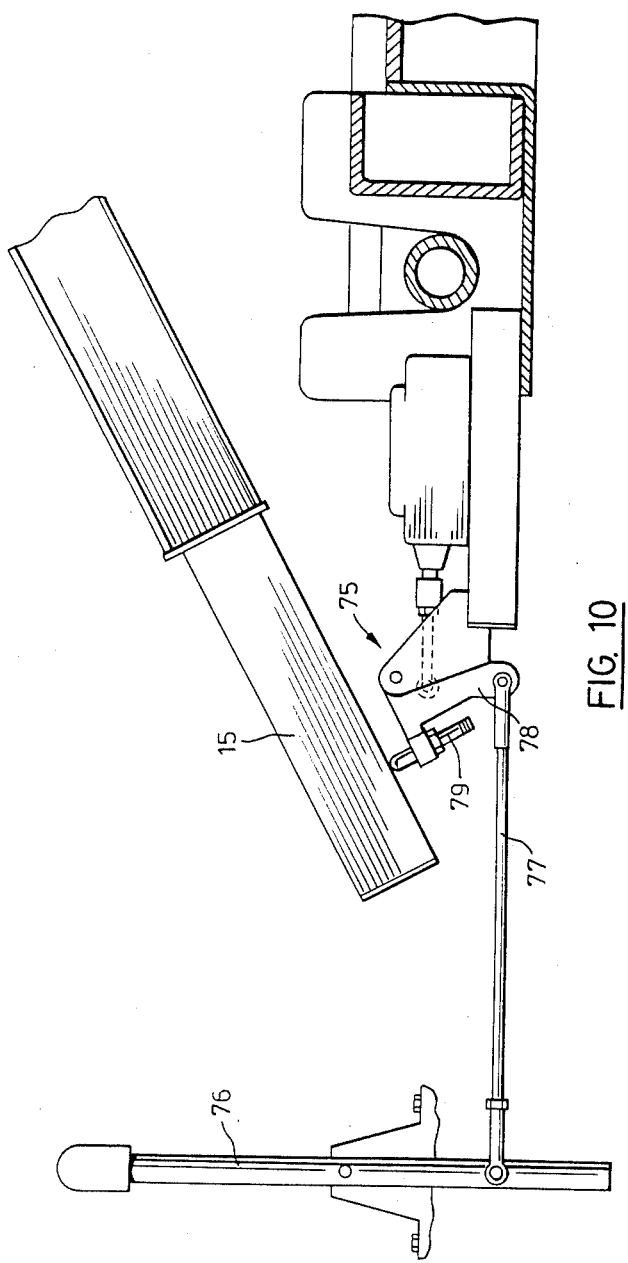
FIG. 10 is a schematic view of a forward tilt limiting device for the dump body.

Referring to FIG. 10, the forward tilt of the dump body 15 is limited to the desired angle of 26° by a limiting device 75. By pulling a control lever 76 for activating the hydraulic pistons 65 toward him, the operator activates the hydraulic pistons 65 through a linkage 77 which is pivotally attached to a control plate 78 which in turn is connected to hydraulic activating means. The plate 78 is provided with an adjustable set screw 79 which is set to engage the dump body 15 and force the control lever 76 into the neutral position thereby disengaging the hydraulic activating means when the forward tilt is at the desired angle of 26°.

We claim:

1. A dual purpose vehicle having a dump body being pivotable in either a forward or rearward direction, comprising:

a base frame secured to the vehicle chassis, said frame having a front and a rear end;

a dump body mounted on the base frame, said body having a front and a rear end and a floor;

a removable ultra-high density plastic inlay having a flat upper surface for the floor upon which a dry salt/sand mixture has a coefficient of static friction of less than 0.55;

delivery means within the dump body for delivering granular material therein to an outlet adjacent the front end of the dump body;

spreader means mounted below the dump body and being positioned to receive granular material from the outlet;

a first hinge comprising, a first set of interengageable hinge sockets affixed near the rear ends of the base frame and dump body, said sockets having a pair of male sockets located on the dump body and a pair of female sockets located on the base frame; a tubular bearing for receiving the weight of the dump body, said bearing being positioned in and extending through the pair of male sockets and being rotatable about its longitudinal axis, the bearing ensuring alignment of the engaged sockets; collars affixed to the bearing slightly beyond the outer faces of the male sockets for holding the bearing in the sockets; and a hinge pin insertable within the bearing for maintaining the alignment of the hinge sockets when engaged;

a second hinge comprising, a second set of interengageable hinge sockets affixed near the front ends of the base frame and dump body, said sockets having a pair of male sockets located on the dump body and a pair of female sockets located on the base frame; a tubular bearing for receiving the weight of the dump body, said bearing being positioned in and extending through the pair of male sockets and being rotatable about its longitudinal axis, the bearing ensuring alignment of the engaged sockets; collars affixed to the bearing slightly beyond the outer faces of the male sockets for holding the bearing in the sockets; and a hinge pin insertable within the bearing for maintaining the alignment of the hinge sockets when engaged; and hydraulic means for raising and lowering the dump body pivotally about one of the hinges.

2. A vehicle as claimed in claim 1, wherein the dump body is approximately 14 feet long and the angle of forward tilt thereof is restricted to a maximum of 26° from horizontal.

3. A vehicle as claimed in claim 1, further comprising a forward tilt limiting device which stops the flow of hydraulic fluid to the hydraulic means when the desired angle of forward tilt for the dump body is attained.

4. A vehicle as claimed in claim 1, further comprising hinge pin retaining means for preventing accidental removal of the hinge pin.

5. A vehicle as claimed in claim 1, wherein the spreader means comprises a spinner.

6. A vehicle as claimed in claim 1, further comprising a toggle linkage connected between the base frame and dump body at a position intermediate thereof, and wherein the hydraulic means comprises an hydraulic ram pivotally connected at one end to the base frame and at the other end to the toggle linkage for actuating the toggle linkage so as to permit pivotal movement of the dump body about one of the hinges.

7. A vehicle as claimed in claim 6, wherein the hydraulic ram comprises twin hydraulic cylinders for actuating the toggle linkage.

* * * * *